United States Patent [19]

Leverenz et al.

[11] Patent Number: 5,102,994
[45] Date of Patent: Apr. 7, 1992

[54] DISPERSE AZO DYESTUFFS CONTAINING A THIOCYONATE GROUP

[75] Inventors: Klaus Leverenz, Leverkusen; Manfred Hoppe, Kuerten, both of Fed. Rep. of Germany

[73] Assignee: Bayer Aktiengesellschaft, Leverkusen, Fed. Rep. of Germany

[21] Appl. No.: 591,660

[22] Filed: Oct. 2, 1990

[30] Foreign Application Priority Data

Oct. 17, 1989 [DE] Fed. Rep. of Germany ....... 3934544

[51] Int. Cl.$^5$ ...................... C09B 29/085; D06P 1/18
[52] U.S. Cl. .................................................. 534/735
[58] Field of Search ......................................... 534/735

[56] References Cited

U.S. PATENT DOCUMENTS 3,522,235  7/1970  Baron et al. ................. 534/735 X
4,119,624 10/1978  Boyd et al. .................. 534/735 X

FOREIGN PATENT DOCUMENTS 549627   5/1974  Switzerland .
976218  11/1964  United Kingdom ........... 534/735
1426729  3/1976  United Kingdom .

OTHER PUBLICATIONS

Farbenfabriken Bayer, Chemical Abstracts, vol. 57, No. 2371f (1962).
Derwent Japanese Patents Report, F. Textiles, Papers, Cellulose Japanese 4-10 2.71 vol. 5, No. 6, Section F, p. 10 & JP-A-71 05 274 (Sumitomo Chem. Co. Ltd) 09/02/1971.

Primary Examiner—Mary Lee
Assistant Examiner—Fiona T. Powers
Attorney, Agent, or Firm—Sprung Horn Kramer & Woods

[57] ABSTRACT

Water-insoluble dyestuffs of the formula I

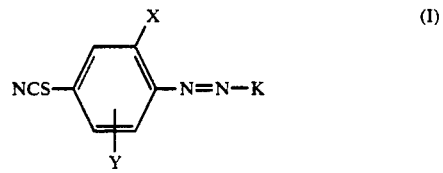

wherein
K denotes the radical of a coupling component of the aniline series,
X denotes Cl, Br, Cn or COOZ,
Y denotes H, Cl, Br or CN and
Z denotes $C_1$-$C_4$-alkyl, are outstandingly suitable for dyeing polyester fibres, on which they produce brilliant dyeings with good general fastness properties.

6 Claims, No Drawings

DISPERSE AZO DYESTUFFS CONTAINING A THIOCYANATE GROUP

The invention relates to disperse azo dyestuffs of the formula I

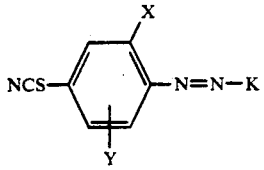
(I)

wherein
K denotes the radical of a coupling component of the aniline series,
X denotes Cl, Br, CN or COOZ,
Y denotes H, Cl, Br or CN and
Z denotes $C_1-C_4$-alkyl.

Preferred dyestuffs correspond to the formula II

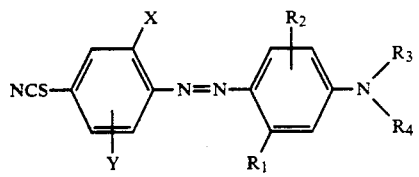
(II)

wherein—independently of one another—
$R_1$ is H, OH, Z, OZ, Cl, COOZ, $CONH_2$ or NHAc,
$R_2$ is H, Cl, Z, OZ or COOZ and
$R_3$ are H, Z or $C_2-C_5$-alkyl which is optionally substituted by CN, Cl, OH, OZ, COOZ, OCOZ, OCOOZ or phenyl,
wherein
X, Y and Z have the abovementioned meaning and
Ac represents an acyl radical from the series comprising COZ, $SO_2Z$, COOZ and $CONH_2$.

Particularly preferred dyestuffs are those of the formulae I or II wherein
X denotes COOZ or CN,
Y denotes H or Cl,
$R_1$ denotes $CH_3$, NHCOZ or $SO_2Z$,
$R_2$ denotes H and
$R_3$ and $R_4$ denote Z, or $C_2-C_4$-alkyl which is optionally substituted by CN, OZ, OCOZ or, wherein Z is as defined above.

Amongst these dyestuffs, those which are in turn preferred are the dyestuffs of the formulae shown wherein
X represents CN.

Especially preferred dyestuffs are those of the formulae I and II wherein
X, Y, Z and $R_2$ have the abovementioned meanings,
$R_1$ denotes NHCOZ and
$R_3=R_4$ and both denote $C_2H_4OZ$.

Z in particular represents $CH_3$ or $C_2H_5$ in these dyestuffs.

The new dyestuffs are preferably obtained by a process in which diazotized amines of the formula III

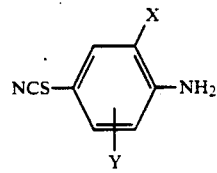
(III)

are coupled to coupling components of the formula IV

K—H  (IV)

in the customary manner.

The diazotization is preferably carried out by means of nitrosylsulphuric acid in glacial acetic acid/phosphoric acid mixtures.

Both the diazotization and the coupling can be carried out in the presence of water-miscible organic solvents, dispersing or wetting agents and emulsifiers.

The addition of seed crystals is occasionally advisable.

Suitable solvents are $C_1-C_4$-alcohols, glycols, glycol ethers, dialkyl ethers, esters and ketones.

Dyestuffs of the formula

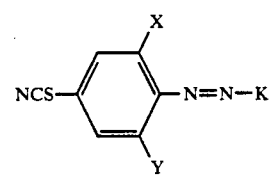

wherein X and/or Y denote cyano can advantageously also be prepared from the corresponding halogenoazo dyestuffs (X/Y=Cl or Br) by reaction with cyanides.

Such halogen/cyano exchange reactions have been described in many instances in the literature (compare, for example, U.S. Pat. No. 3,962,209).

Only some of the amines of the formula III are known. They can easily be prepared by methods which are known per se, for example by introducing the thiocyano group into aromatic amines of the formula IV

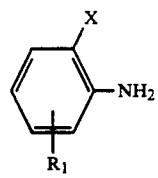
(IV)

using bromine and alkali metal thiocyanates in aqueous or organic or aqueous-organic solvents, such as methanol, glacial acetic acid or propionic acid, if appropriate with the addition of mineral acids, such as HBr or $H_3PO_4$ (compare "Pharmazie", 32, 195-215 (1977)).

The dyestuffs of the formula I or II are suitable for dyeing polyester materials in orange, red and violet shades. The dyeings are distinguished by brilliance, depth of colour, fastness to light and good fastness to thermomigration.

Dyestuffs of the formula I or II are also suitable for textile and non-textile thermal transfer printing. These printing processes are also generally known.

In the following examples, "parts" denote parts by weight.

Examples

EXAMPLE 1

9 parts of methyl 2-amino-5-thiocyanato-benzoate are diazotized with 7.5 parts of nitrosylsulphuric acid in a mixture of 60 parts of glacial acetic acid and 20 parts of propionic acid at 0°-5° C. The solution of the diazonium salt is added to a mixture of 9.1 parts of N-ethyl-N-(2-cyanoethyl)-3-methylaniline, 0.5 part of amidosulphonic acid, 50 parts of glacial acetic acid and 100 parts of ice and the coupling is brought to completion by addition of 12 parts of 30% strength sodium hydroxide solution. The dyestuff of the formula

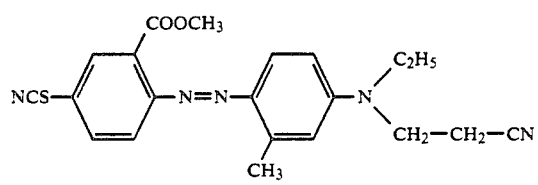

which initially separates out in resinous form crystallizes after prolonged stirring. The absorbtion spectrum of the dyestuff recorded in dimethylformamide has a maximum at 452 nm. The dyestuff dyes polyethylene terephthalate fibres (PE) in clear orange-coloured shades of good fastness to light, wet processing and sublimation.

The dyestuffs of the formula V are obtained analogously:

mixture of 35 parts of concentrated $H_2SO_4$ and 13 parts of 85% strength $H_3PO_4$ at 0°-5° C.

The solution of the diazonium salt is added dropwise to a mixture of 15 parts of N-butyl-N-(2-cyanoethyl)-3-methylaniline, 100 parts of methanol, 0.5 part of amidosulphonic acid and 250 parts of ice and the coupling is brought to completion by dropwise addition of 100 parts of 30% strength sodium hydroxide solution.

27.5 parts of the dyestuff

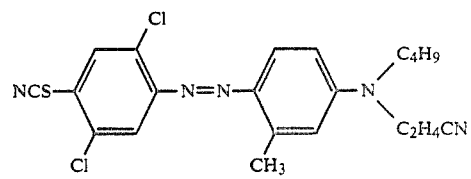

$\lambda_{max}$ 451 nm (DMF), which dyes polyester fibres in orange-coloured shades of good fastness to light, are obtained.

The dyestuffs of the formula VI

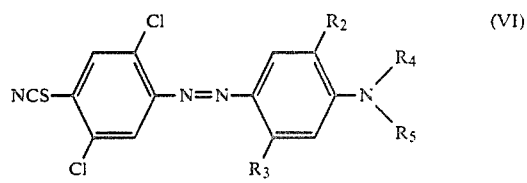

are obtained analogously.

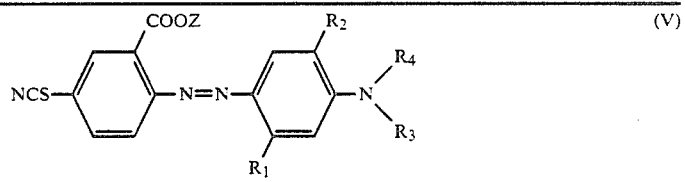

| No. | Z | $R_1$ | $R_2$ | $R_3$ | $R_4$ | $\lambda_{max}$ in nm | Colour shade on PE |
|---|---|---|---|---|---|---|---|
| 2 | $C_4H_9$ | H | H | $C_3H_7$ | $C_2H_4$—$COOCH_3$ | 440 | golden yellow |
| 3 | $C_2H_5$ | $CH_3$ | H | $C_4H_9$ | $C_2H_4$—CN | 454 | orange |
| 4 | $CH_3$ | $NHCOCH_3$ | H | $C_3H_7$ | $C_3H_7$ | 493 | scarlet |
| 5 | $CH_3$ | $NHCO_2H_5$ | H | $C_2H_4OCOCH_3$ | $C_2H_4OCOCH_3$ | 466 | orange |
| 6 | $C_2H_5$ | $NHCOC_4H_9$ | $OCH_3$ | $C_2H_5$ | $C_2H_4$—CN | 495 | scarlet |
| 7 | $CH_3$ | $CH_3$ | H | $CH_3$ | $C_2H_4$—CN | 450 | orange |
| 8 | $CH_3$ | $NHCOCH_3$ | H | $C_2H_5$ | $C_2H_4$—CN | 468 | orange |
| 9 | $C_2H_5$ | $NHCOCH_3$ | H | $C_2H_4COOCH_3$ | $C_2H_4COOCH_3$ | 462 | orange |

| No. | $R_2$ | $R_3$ | $R_4$ | $R_5$ | $\lambda_{max}$ nm | Colour shade on PE |
|---|---|---|---|---|---|---|
| 11 | H | $CH_3$ | $C_2H_5$ | $C_2H_5$ | 468 | orange |
| 12 | H | $CH_3$ | $C_4H_9$ | $C_2H_4OCO_3$ | 457 | orange |
| 13 | H | $NHSO_2CH_3$ | $C_2H_4OCH_3$ | $C_2H_4OCH_3$ | 484 | reddish-tinged orange |
| 14 | H | $NHCOCH_3$ | $C_3H_7$ | $C_3H_7$ | 512 | yellowish-tinged red |
| 15 | H | $NHCOCH_3$ | $C_2H_4OCH_3$ | $C_2H_4OCH_3$ | 508 | yellowish-tinged red |

The diazo components used in these examples were prepared by introducing the thiocyano group into the corresponding anthranilic acid esters by the process described by Neu in the journal Pharmazie 3 (1948) 151.

EXAMPLE 10

15.9 parts of 2,5-dichloro-4-thiocyanato-aniline are diazotized with 13.2 parts of nitrosylsulphuric acid in a

EXAMPLE 16

7.6 parts of 2-amino-5-thiocyanato-benzonitrile are diazotized in aqueous hydrochloric acid at 0°-5° C. and the solution is clarified and combined with a solution of 13.2 parts of 3-[-(bis-2-methoxyethyl)amino]acetanilide in aqueous hydrochloric acid. The coupling must be brought to completion by addition of 30% strength sodium hydroxide solution at 0°-5° C. The dyestuff which initially separates out in resinous form becomes crystalline after prolonged stirring. It corresponds to the formula

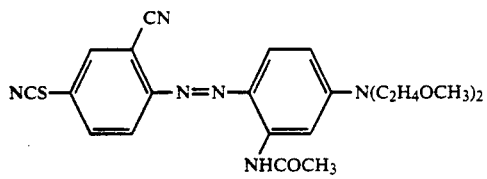

λ$_{max}$ 515 nm (DMF) and dyes polyester materials in clear red shades of very good fastness to light, sublimination, wet processing and thermomigration.

The dyestuffs of the formula VII

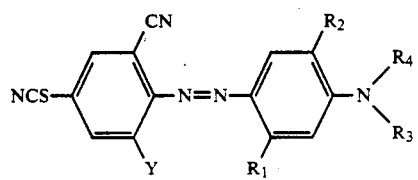

are obtained analogously.

in this form or the non-crystallized form, are obtained. It is contaminated with small amounts of 2-amino-5-bromo-benzonitrile.

EXAMPLE 27

6.1 parts of 2-amino-5-thiocyanato-6-chlorobenzonitrile are diazotized with 5 parts of nitrosylsulphuric acid in 40 parts of glacial acetic acid and 15 parts of propionic acid at −5-0° C.

The diazonium salt solution thus obtained is introduced into a cold (0° C.) solution of 5.8 parts of 1-(m-tolyl)-3,5,5-trimethylpyrazoline in 40 parts of glacial acetic acid and 20 parts of propionic acid such that the temperature does not rise above 5° C.

After 30 minutes, the product is precipitated with 50-70 parts of water, isolated, washed and dried.

9 parts of the dyestuff of the formula VIII

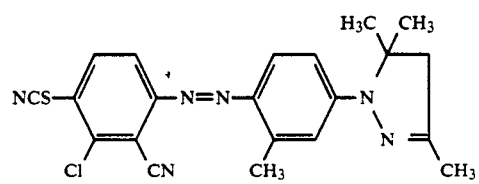

(λ$_{max}$ (DMF) 536 nm), which dyes polyester in red-vio-

| No. | Y | R$_1$ | R$_2$ | R$_3$ | R$_4$ | λ$_{max}$ in nm | Colour shade on PE |
|---|---|---|---|---|---|---|---|
| 17 | H | NHCOCH$_3$ | H | C$_2$H$_5$ | C$_2$H$_5$ | 520 | red |
| 18 | H | NHCOCH$_3$ | H | OCOCH$_3$ | OCOCH$_3$ | 519 | red |
| 19 | H | CH$_3$ | H | C$_4$H$_9$ | C$_2$H$_4$CN | 493 | reddish-tinged orange |
| 20 | H | NHCOCH$_3$ | OCH$_3$ | C$_2$H$_5$ | C$_2$H$_4$CN | 533 | ruby |
| 21 | H | NHCOC$_3$H$_7$ | Cl | H | C$_2$H$_4$OCH$_3$ | 492 | reddish-tinged orange |
| 22 | H | NHSO$_2$CH$_3$ | H | C$_2$H$_5$ | C$_2$H$_5$ | 512 | red |
| 23 | H | NHCOCH$_3$ | Cl | H | C$_2$H$_4$OH | 498 | scarlet |
| 24 | Br | NHCOCH$_3$ | OCH$_3$ | C$_2$H$_5$ | C$_2$H$_5$ | 592 | reddish-tinged blue |
| 25 | H | NHCOCH$_3$ | H | C$_2$H$_4$OC$_2$H$_5$ | C$_2$H$_4$OC$_2$H$_5$ | 516 | red |
| 26 | H | NHCOC$_2$H$_5$ | H | C$_2$H$_4$OCH$_3$ | C$_2$H$_4$OCH$_3$ | 515 | red |

The 2-amino-5-thiocyanato-benzonitrile used in these examples can be prepared as follows:
200 parts of bromine are slowly added to
118 parts of 2-aminobenzonitrile and
123 parts of sodium thiocyanate in
300 parts of glacial acetic acid and
150 parts of 85% strength orthophosphoric acid at about 10° C.

The reaction mixture is poured onto 500 parts of ice-water, and 150 parts of 30% strength sodium hydroxide solution are allowed to run in. The crystalline precipitate is filtered off with suction, washed and dried. About 155 parts of crude product (melting point 116° C.), which can be employed for dyestuff synthesis let shades of good fastness to wet processing and thermomigration, are obtained.

The dyestuffs of the formula IX

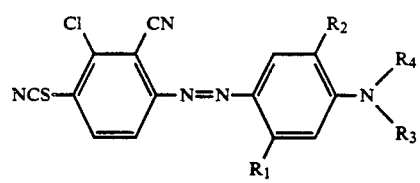

are obtained analogously.

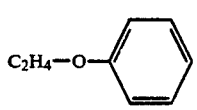

-continued

| No. | $R_1$ | $R_2$ | $R_3$ | $R_4$ | $\lambda_{max}$ in nm | Colour shade on PE |
|---|---|---|---|---|---|---|
| 32 | $CH_3$ | H | $C_2H_5$ | $C_2H_4OCO$—〔phenyl〕 | 514.8 | yellowish-tinged red |
| 33 | $CH_3$ | H | $C_2H_5$ | $CH_2$—〔phenyl〕 | 516 | yellowish-tinged red |
| 34 | $CH_3$ | H | $C_2H_5$ | $C_2H_5$ | 523 | red |

The 2-amino-5-thiocyanato-6-chloro-benzonitrile used in Examples 27-34 can be prepared as follows:

40 parts of 2-amino-6-chloro-benzonitrile are introduced into 100 parts of glacial acetic acid and 40 parts of propionic acid. 53 parts of potassium thiocyanate are added and the mixture is cooled to 0° C. 43 parts of bromine are added dropwise in the course of 2 hours, during which the temperature should not rise above 5° C. After 2 hours, the mixture is warmed to 20° C. and poured onto 300 parts of ice/water, and the product is isolated and dried. The product thus obtained (melting point 136°-145° C.) contains small amounts of brominated amines. It can be used for dyestuff synthesis by recrystallization from dimethylformamide/water or in nonpurified form.

We claim:

1. A disperse azo dyestuff of the formula (II)

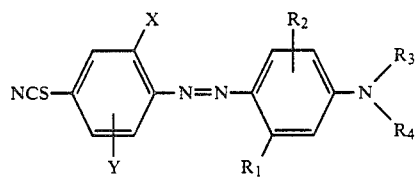

wherein
  X denotes CN or COOZ
  Y denotes H, Cl, Br or CN
  Z denotes $C_1$-$C_4$-alkyl,
and, independently of one another,
  $R_1$ represents H, OH, Z, OZ, Cl, COOZ, $CONH_2$ or NHAc,
  $R_2$ represents H, Cl, Z, OZ, or COOZ and
  $R_3$ and $R_4$ represent Z or $C_2$-$C_5$-alkyl, which is optionally substituted by CN, Cl, OH, OZ, COOZ, OCOOZ, or phenyl,
wherein
  Ac represents an acyl radical from the series comprising COZ, $SO_2Z$, COOZ and $CONH_2$.

2. A dyestuff according to claim 1, characterized in that
  X denotes COOZ or CN,
  Y denotes H or Cl,
  $R_1$ denotes $CH_3$, NHCOZ or $NHSO_2Z$,
  $R_2$ denotes H and
  $R_3$ and $R_4$ represent Z or $C_2$-$C_4$-alkyl, which is optionally substituted by CN or OZ, and
  Z has the meaning given in claim 1.

3. A dyestuff according to claim 1, characterized in that X represents CN.

4. A dyestuff according to claim 1, characterized in that
  $R_1$ denotes NHCOZ and
  $R_3$=$R_4$ and both denote $C_2H_4OZ$.

5. A dyestuff of the formula

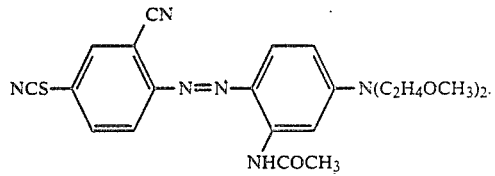

6. Process for dyeing and printing polyester materials, characterized in that dyestuffs according to anyone of claims 1 to 5 are used.

UNITED STATES PATENT AND TRADEMARK OFFICE
CERTIFICATE OF CORRECTION

PATENT NO. : 5,102,994

DATED : April 7, 1992

INVENTOR(S) : Leverenz et al.

It is certified that error appears in the above-identified patent and that said Letters Patent is hereby corrected as shown below:

Title Page     [54] Delete " THIOCYONATE " and substitute -- THIOCYANATE --

Col. 1, line 2     In the title delete " THIOCYONATE " and substitute -- THIOCYANATE --

Signed and Sealed this

Second Day of November, 1993

Attest:

BRUCE LEHMAN

Attesting Officer     Commissioner of Patents and Trademarks